P. PATTERSON.
MANUFACTURE OF TUBING.
APPLICATION FILED SEPT. 15, 1911.

1,042,593.

Patented Oct. 29, 1912.
3 SHEETS—SHEET 1.

WITNESSES.
J. R. Keller
Robert C. Totten

INVENTOR.
Peter Patterson
By Kay & Totten
Attorneys

P. PATTERSON.
MANUFACTURE OF TUBING.
APPLICATION FILED SEPT. 15, 1911.

1,042,593.

Patented Oct. 29, 1912.
3 SHEETS—SHEET 3.

WITNESSES.
J. R. Keller
Robert C. Totten

INVENTOR.
Peter Patterson
By Kay & Totten
Attorneys

UNITED STATES PATENT OFFICE.

PETER PATTERSON, OF PITTSBURGH, PENNSYLVANIA.

MANUFACTURE OF TUBING.

1,042,593.

Specification of Letters Patent. Patented Oct. 29, 1912.

Application filed September 15, 1911. Serial No. 649,465.

*To all whom it may concern:*

Be it known that I, PETER PATTERSON, a citizen of the United States, and resident of Pittsburgh, in the county of Allegheny and State of Pennsylvania, have invented a new and useful Improvement in the Manufacture of Tubing; and I do hereby declare the following to be a full, clear, and exact description thereof.

My invention relates to the manufacture of tubing, its general objects being to increase the output and the quality of the pipe and to produce a larger proportion of pipe; and its special objects being to provide for the more uniform working of blanks for the manufacture of lap weld tubing by providing a full supply of skelp at a high uniform heat for the welding furnace; by providing for the proper finishing of the pipe so as to deliver it to the threading machines in true cylindrical form and so do away with the necessity of the rounding of the pipe ends for threading, and yet care for all the pipe welded so that large outputs can be obtained; and by the removal of the scale from the pipe during the cooling thereof to polish the same and provide for the formation of a protective oxid coating thereon; thus leading to the manufacture of much more perfect pipe, doing away with the necessity of reheating and rerolling, increasing the production and forming the whole body of the pipe of true cylindrical form and with much more perfect and rust resisting surface.

To these ends my invention comprises the following steps; alternately charging plates into two bending furnaces located side by side; heating the plates in one furnace when kept closed while drawing the plates from the other furnace and bending them into skelp; charging the heated bent skelp from both bending furnaces into the one welding furnace and raising the same therein to welding heat and welding them into tubing; subjecting the welded tubing to a prolonged cross roll finishing at a slow forward feed, and at the same time removing the scale from the surfaces thereof in the cross rolling, which is continued until the tubing is brought below a scaling heat, thereby holding the tubing in true cylindrical form until it is set, providing a smooth surface and forming a permanent protective oxid on such surface.

It also comprises certain steps in this general manufacture as hereinafter set forth and claimed.

Figure 1:
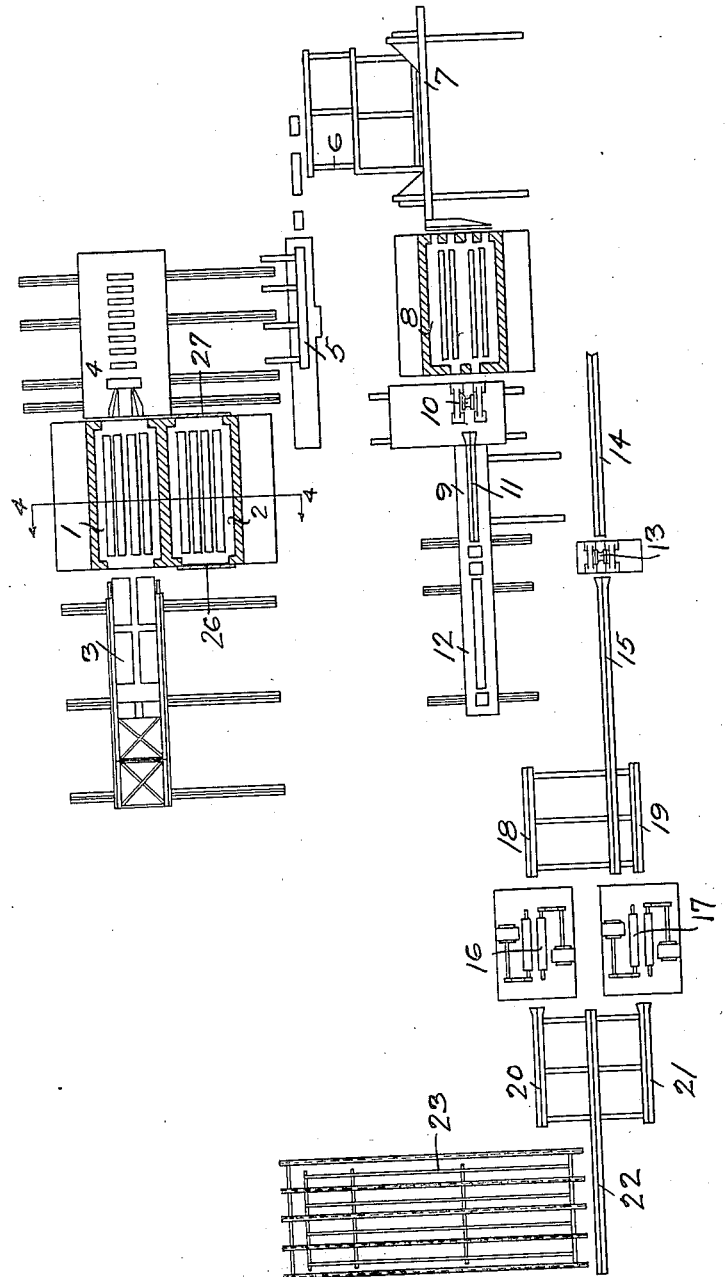
Figure 2:
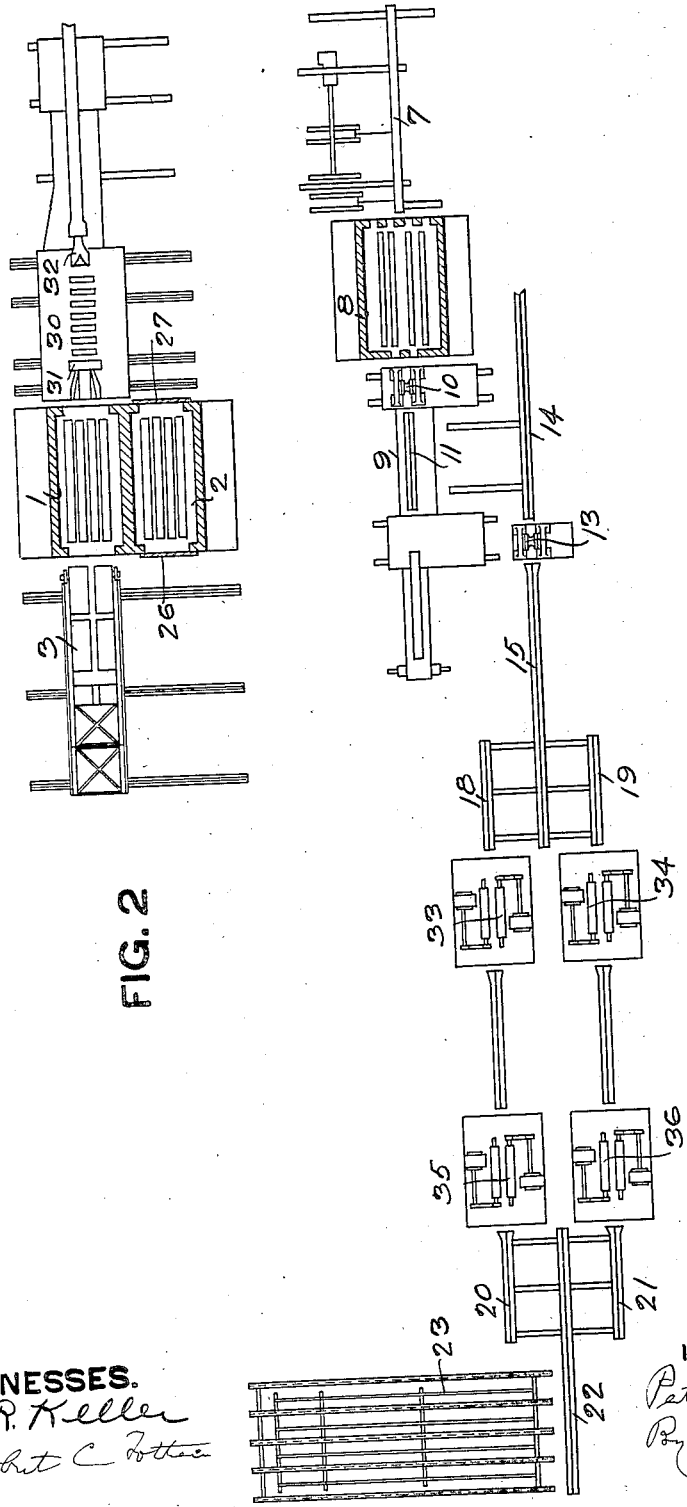
Figure 3:
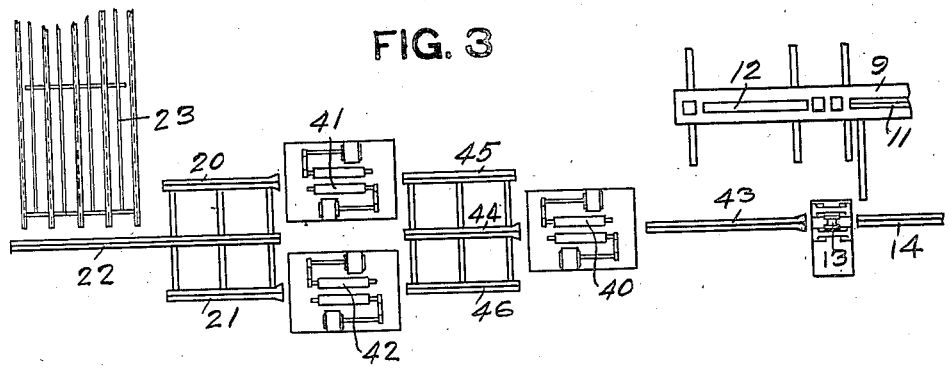
Figure 4:
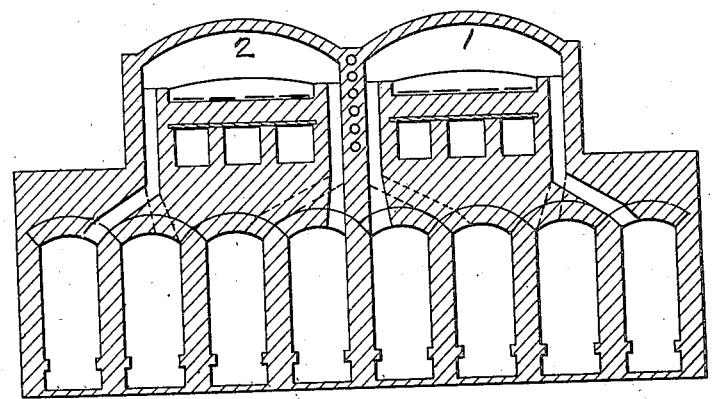
Figure 5:
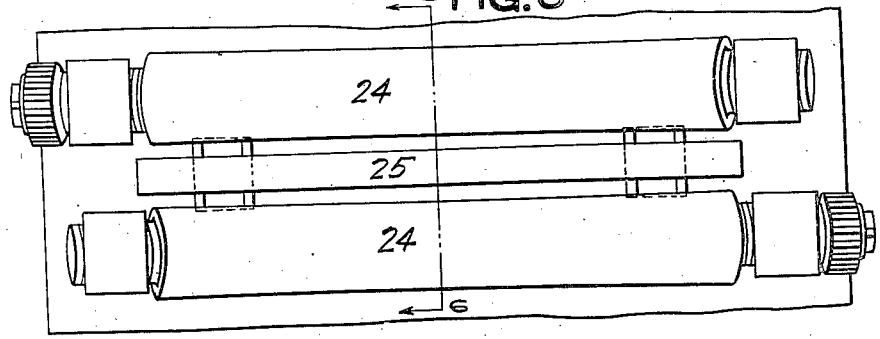
Figure 6:
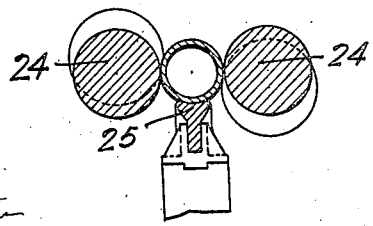

In the accompanying drawings Figure 1 is a diagrammatic plan view of apparatus suitable for the practice of the invention; Figs. 2 and 3 are like views of other forms suitable for the practice of the same; Fig. 4 is a cross section on the line 4—4 Fig. 1, of the bending furnace; Fig. 5 is an enlarged top or plan view of the finishing rolls; and Fig. 6 is a cross section of the same.

That my improved manufacture of tubing may be more easily understood I will first describe an approved plant for practising the same.

Referring to Fig. 1, 1 and 2 are the bending furnaces set side by side in which the skelp plates are heated, the drawing showing four plates on each hearth. 3 is the plate charging machine adapted to travel laterally across the front of the furnaces, 1 and 2, and 4 is the scarfing machine also traveling laterally across the rear of the furnaces. 5 is the bending machine which can be of any desired form. The bending machine 5 delivers the skelp onto the rack 6 from which they are charged by the pusher 7 into the welding furnace 8. The welding machine 9 is illustrated as traveling laterally at the back of the welding furnace which furnace is shown as having two ports and is illustrated with two skelp resting in line with said ports so that they may be pushed into the rolls which are moved into line with the ports. The welding machine has the rolls 10 and the receiving trough 11 and bar puller 12. The sizing rolls 13 at the side of the welding machine are formed of two concave rolls power driven and have the receiving trough 14 in front thereof, and the delivery trough 15 leads therefrom to the cross roll finishing machines. I employ two sets of finishing rolls 16, 17 having the feeding troughs 18 and 19 in front of them and the receiving troughs 20 and 21 in line with the finishing rolls, and between said receiving troughs the delivery trough 22 leading to the cooling table 23.

I prefer to provide the cross roll finishing machines with rolls of as great length as practicable, for example, for large pipe as long as eighteen feet, and they are made to feed the tubing through the same at a slow speed, practically at about one-half the speed commonly employed. For example, the travel of the pipe through the finishing rolls as commonly employed is about 5½ inches per revolution of the rolls, that speed being necessary to take care of the production of the welding furnace where only a single set of finishing rolls is employed. The finishing rolls as preferably employed in the practice of my invention operate at a longitudinal feed of the pipe of about two or three inches per revolution of the rolls, this being accomplished by the angular position or "set" of the rolls and by the concavity given thereto. As shown in the enlarged view Fig. 5, and the cross section Fig. 6 of the finishing rolls, each set is formed of two rolls 24 set diagonally and slightly concave, and between them is the pipe support 25, so located that as the pipe is rotated by the rolls it contacts with the surface of the support for the purpose hereinafter described.

In the practice of the invention with the above apparatus, the plates are charged into the two bending furnaces alternatively, for example, four plates upon the hearth of each furnace, and in the regular operation as soon as one furnace is so charged the doors 26, 27 of that furnace are closed so that the plates therein are subjected to a high steady heat and all cooling of the furnace by the entrance of air through the doors prevented until the plates are brought up nearly to the temperature at which they are to be delivered from the furnace. Each furnace can be made narrower than the single bending furnace now employed, where the hearth is made wide enough to receive, say, six plates, and in this way I am enabled to increase the number of plates heated for bending into skelp by, say one-third. By the employment of two furnaces, however, a higher and more uniform heat can be maintained in each one because the hearth is narrower and the furnace can be operated to carry the flame and heat entirely across the hearth and to heat the checkerwork of the regenerators, overcoming the necessity of forcing the furnace by a strong draft, and carrying a greater heat back into the furnace when it is reversed. A higher heat is thus generated because the flame and heat are not required to travel so great a distance over the hearth, while as the doors of the furnace can be kept closed for a much longer period, overcoming the sucking in of air through the same, a much higher and more uniform heat is produced and the plates in each furnace can be more quickly raised to the proper bending heat. When the plates are first charged into the bending furnace the doors of the furnace are closed while the plates are being withdrawn from the other bending furnace, the charging and scarfing or scarfing and bending apparatus being moved laterally into line with the plates, and they are pushed from the furnace in the ordinary way. As soon as the plates have all been fed from that furnace, for example, from the furnace 1, the charging and scarfing mechanism is moved into line with the other furnace 2 and the plates fed therefrom as needed, the first furnace 1 being re-charged with plates and the doors closed subjecting the plates in this furnace to the high heat thereof without disturbance by the entrance of air while the plates from the second furnace are being formed into skelp. In this way a full supply may be provided for the single welding furnace 8, being delivered on the rack 6 and carried down in proper position for feeding into the welding furnace by the pusher 7 and the skelp as so provided being at a higher heat than practicable where only a single bending furnace is employed; and therefore less time is required for bringing the same up to the proper welding heat in the welding furnace.

As the skelp are brought to the proper welding heat they are pushed out through the welding rolls of the welding machine onto the trough 11, the mandrel bar is withdrawn by the mandrel bar puller 12 and the pipe delivered laterally over into the trough 14 and then passed through the sizing machine 13 into the trough 15. They are carried along this trough and delivered alternately to the troughs 18 and 19 of the finishing rolls 16 and 17 each alternate pipe passing through the same set of finishing rolls into the receiving trough 20 or 21, and being then delivered into the delivery trough 22 and thence to the cooling table. As each set of finishing rolls receives only each alternate pipe, and as these rolls are operated at a very slow speed, even though the apparatus is able to take care of all the pipe welded, the pipe are subjected to prolonged cross roll finishing at slow forward feed, being cooled not only by the absorption of the heat from the pipe by the finishing rolls but by water cooling over their surfaces so that in the prolonged cross roll finishing they are brought down to a low temperature and being first brought to true cylindrical shape and held within said rolls until set, so that they are much below the temperature at which they would be liable to sag and lose shape when on the cooling table. In this slow cross roll finishing the surfaces of the pipe are carried continually over the pipe support of the finishing rolls and contact of the pipe surface with such pipe support is practically doubled because of the slow feed of the pipes through the finishing rolls, thus scraping off the scale from the pipe forming smooth surfaces thereon free from scale and in fact largely polished. In this treatment the pipe are brought down to a temperature below the ordinary scaling heat, indeed, to a temperature in the neighborhood of or below 1000° Fah. and the exposure of the smooth surfaces formed on the pipe, under the water cooling and the exposure to the atmosphere leads to the formation of a permanent oxid coating on the pipe which protects the same from rapid corrosion. In so operating I provide practically the same conditions as are present in the formation of polished sheet iron, the slow finishing leading to the scraping and removal from the bodies of the pipe of the scale formed by the high heat of the welding furnace, and absorbing the heat from the pipe in such way that when it leaves the finishing rolls it is at the proper temperature for the formation of such permanent oxid coating which is gradually formed thereon in the further cooling on the cooling table.

One pipe passing through the sizing rolls is fed into the trough 18 and passes through the finishing rolls 16 while the next pipe is fed into the trough 19 and passes through the finishing rolls 17, and thus the two sets of finishing rolls are acting on two different pipes at the same time, so that I am enabled to apply this prolonged cross roll finishing at slow forward feed while taking care of as many pipe as are produced by the welding furnace in ordinary operation. The slow cross roll finishing brings the pipe to such low heat that they are set, and as the pipe pass they are not liable to warp in the further cooling thereof, and they retain their true cylindrical form, and therefore it is unnecessary to subject them to the rounding-up treatment in the threading machines before being threaded, and the production from the threading machines is thereby very largely increased while better pipe is formed because the crystallizing action due to the cold rounding-up process is done away with. I am thus enabled to obtain a much greater production because I am enabled to provide all the skelp that the welding furnaces can take care of and feed the skelp to the furnaces at a higher temperature, and I am enabled to roll finish the same so perfectly that practically none of the pipe will require a second heating and passage through the welding rolls on account of being out of round or crooked when delivered from the cooling table, and at the same time obtain the important advantages above set forth. I also obtain such advantages without extra labor cost, as no more labor is required either in the bending or finishing operations.

The plant as illustrated in Fig. 1 is more particularly adapted for the forming of larger pipe, for example, pipe 10 inches in diameter and larger.

In Fig. 2 I have shown a plant for practising the invention which is more particularly adapted for the making of smaller pipe where a larger number are made, the same parts illustrated in the said Fig. 2 having the same reference numerals, and I will only refer to the mechanism as changed. For example, the carriage 30 is illustrated as carrying both the scarfing rolls 31 and the bending die 32, so that the scarfed plate passes longitudinally instead of laterally to the bending machine. The plant is provided with four sets of finishing rolls, for example, the rolls 33, 34, 35 and 36. The operation is practically the same as above described with the addition that each welded pipe passes through two sets of finishing rolls and is therefore subjected to a more prolonged cross roll finishing, for example, the pipe passing from the trough 15 alternately to the trough 18 and thence through the rolls 33, and thence in direct line into the finishing rolls 35, while the next pipe passes into the trough 19 and thence through the finishing rolls 34 and the second set of finishing rolls 36. The apparatus is thus adapted to take care of a larger number of smaller sized pipe produced in the welding furnace, prolonged cooling action being obtained, or even a greater cooling action by such successive cross roll finishing, and the pipe being held within the finishing rolls a sufficiently long time to insure their being set in true cylindrical shape.

Fig. 3 shows another variation in the arrangement of the plant, illustrating three sets of cross roll finishing machines, as shown at 40, 41 and 42. In this case the welded pipe first passes through the sizing rolls 13 and into the trough 43 from which it passes directly through the finishing rolls 40 which may be driven at the full speed heretofore employed for this class of rolls. It then passes into the trough 44 and each alternate pipe passes to the trough 45 and through the finishing rolls 41, while the next pipe passes to the trough 46 and through the finishing rolls 42. In said rolls 41 and 42 the pipe is subjected to the prolonged cross roll finishing at slow forward feed above described and thus held to true cylindrical shape until set, when it is delivered in the way above described to the cooling table.

What I claim is:

1. The method of forming tubing, consisting in alternately charging plates into two bending furnaces located side by side, heating the plates in one furnace when kept closed while drawing the plates from the other furnace and bending them into skelp, charging the heated bent skelp from both bending furnaces into one welding furnace, raising the skelp therein to a welding heat and welding the same into tubing, and subjecting the welded tubing to prolonged cross-roll finishing at a slow forward feed.

2. The method of making tubing, consisting in alternately charging plates into two bending furnaces located side by side, heating the plates in one furnace when kept closed while drawing the plates from the other furnace and bending them into skelp, charging the heated bent skelp from both bending furnaces into one welding furnace, raising the skelp therein to a welding heat and welding the same into tubing.

3. The herein described method of making tubing, consisting in raising the skelp to a welding heat and welding the same into tubing, and subjecting the welded tubing to prolonged cross-roll finishing at slow forward feed until brought below a scaling heat.

4. The herein described method of making tubing, consisting in raising the skelp to a welding heat, and welding the same into tubing, sizing the tubing and subjecting the welded and sized tubing to prolonged cross-roll finishing at slow forward feed until brought below a scaling heat.

5. The herein described method of making tubing, consisting in raising the skelp to a welding heat and welding the same into tubing, sizing the tubing and subjecting the welded and sized tubing to prolonged cross roll finishing and so holding it in true cylindrical shape until set.

6. The method herein described, of making tubing, consistng in raising the skelp in the welding furnace to a welding heat and welding the same into tubing, subjecting the welded tubing to prolonged cross roll finishing at slow forward feed in contact with a tube support, thereby removing the scale from the surface and reducing its temperature below a scaling heat, and exposing the tube to the atmosphere during the further cooling to form a permanent oxid coating on its surface.

7. The herein described method of making tubing, consisting in raising the skelp in a single welding furnace to a welding heat, and welding the same into tubing, feeding each alternate tube through a separate set of cross rolls operating at slow forward feed and thereby subjecting it to prolonged cross roll finishing until set and subjecting every other tube to like cross roll finishing in other sets of rolls.

8. The herein described method of making tubing, consisting in raising the skelp to a welding heat in a single welding furnace and welding the same into tubing, passing each alternate welded tube through a separate cross roll finishing machine operating at slow forward feed and then through a second like cross roll finishing machine in line therewith and so subjecting it to prolonged cross roll finishing at slow forward feed and holding it in true cylindrical shape until set, and subjecting every other tube to like cross roll finishing in other sets of cross rolls.

In testimony whereof, I the said PETER PATTERSON have hereunto set my hand.

PETER PATTERSON.

Witnesses:
  ROBERT C. TOTTEN,
  JOHN F. WILL.